United States Patent [19]

Tinant et al.

[11] Patent Number: 5,605,718
[45] Date of Patent: Feb. 25, 1997

[54] PROCESS FOR THE SURFACE TREATMENT OF AN ARTICLE BY SULPHONATION AND NEUTRALIZATION

[75] Inventors: Anne Tinant, Brussels; Frédéric Menu, Frameries; Zdenek Hruska, Brussels, all of Belgium

[73] Assignee: Solvay (Société Anonyme), Brussels, Belgium

[21] Appl. No.: 458,413

[22] Filed: Jun. 2, 1995

[30] Foreign Application Priority Data

Jul. 20, 1994 [BE] Belgium .............................. 09400693

[51] Int. Cl.$^6$ ...................................................... B05D 3/10
[52] U.S. Cl. ..................... 427/236; 427/237; 427/255.7; 427/335; 427/336; 427/337; 427/412.3
[58] Field of Search ..................................... 427/230, 236, 427/237, 255.7, 335, 336, 337, 412.3; 264/134, 129

[56] References Cited

U.S. PATENT DOCUMENTS

| 2,786,780 | 3/1957 | Walles et al. . | |
|---|---|---|---|
| 3,613,957 | 10/1971 | Walles et al. . | |
| 3,629,025 | 12/1971 | Walles et al. . | |
| 3,911,184 | 10/1975 | Caskey et al. | 428/35 |
| 4,861,250 | 8/1989 | Walles et al. | 425/90 |
| 5,202,161 | 4/1993 | Seizert et al. . | |

FOREIGN PATENT DOCUMENTS

| 58134856 | 8/1983 | Japan . |
|---|---|---|
| 1203437 | 8/1989 | Japan . |

OTHER PUBLICATIONS

SAE Passenger Car Meet. (Dearborn, Mich. Oct. 19–22, 1987) PAP. No. 871999, 9P, Buck et al, "An Evaluation Of Process Parameters To Optimize Gasohol Barrier Properties In HPDE Fuel Tanks".

SAE Int. Congr. (Detroit Feb. 29–Mar. 4, 1988) PAP. No. 8806865 1–8. Smith et al. "Analysis Of Barrier Performance On HDPE Fuel Tanks Using a Mini—Shed Test Procedure".

SAE Passenger Car Meet. (Troy, Mich. Jun. 7–10, 1982) PAP. No. 820800, 22P. Johnke et al. "A status Report On HPDE Fuel Tanks In European Automobiles: Characteristics Of Service Life On Performance".

*Primary Examiner*—Shrive Beck
*Assistant Examiner*—Erma Cameron
*Attorney, Agent, or Firm*—Spencer & Frank

[57] ABSTRACT

Process for the surface treatment of at least a part of an article comprising at least one surface essentially composed of a plastic, the said process comprising at least one sulphonation stage and at least one neutralization stage and being characterized in that the neutralization is carried out by bringing into contact with at least one polyamine compound.

15 Claims, No Drawings

PROCESS FOR THE SURFACE TREATMENT OF AN ARTICLE BY SULPHONATION AND NEUTRALIZATION

FIELD OF THE INVENTION

The present invention relates to a process for the surface treatment of an article by sulphonation and neutralization.

TECHNOLOGY REVIEW

Metals have been used for a long time for the manufacture of substantially impermeable articles such as pipes, films or containers, in particular bottles or tanks. Plastics nowadays offer many advantages in such applications, especially their ease of use, their lightness and their lower sensitivity to corrosion. Nevertheless, the majority of current plastics are not entirely impermeable to some organic substances and especially to some constituents present in fuels. In particular, the relative impermeability of commonly used plastics is very substantially affected by the incorporation in the fuels of one or a number of alcohols such as, for example, ethanol or methanol. In addition, statutory provisions regarding the tolerated emissions into the environment from fuel tanks are increasingly strict, due especially to environmental constraints. It is consequently advisable to be able to have available articles offering substantially increased impermeability, in particular to the abovementioned new fuels.

The document (BE-740,763) mentions the treatment of a container superficially in order to improve its impermeability, by sulphonation in the presence of sulphur trioxide, followed by neutralization. Nevertheless, the impermeability offered by a container thus treated remains low with respect to the abovementioned requirements.

It is also known to obtain improved results, according to the document JP-58-134,856, by sulphonation in the presence of sulphur trioxide and neutralization with ammonia, followed by treatment with an aqueous solution containing an alkaline-earth metal salt, in the case of containers made of plastic intended to contain a mixture of petrol and alcohol. Nevertheless, such a treatment is more complex and of less advantageous industrial use in that it requires an additional stage after sulphonation and neutralization.

SUMMARY OF THE INVENTION

The object of the present invention is consequently to make possible the manufacture, according to a simple process, of articles having a high impermeability, in particular to the abovementioned fuels.

The invention relates, to this end, to a process for the surface treatment of at least a part of an article comprising at least one surface essentially composed of a plastic, the said process comprising at least one sulphonation stage and at least one neutralization stage and being characterized in that at least one neutralization stage is carried out by bringing into contact with at least one polyamine compound.

DETAILED DESCRIPTION OF THE INVENTION

The articles concerned can be of any type, for example in the form of a film, panel, pipe or hollow body and the like. The invention is advantageous in the case of a hollow body. It is very particularly advantageous in the case of a fuel tank. It also advantageously applies to another hollow body, to a pipe or to another article associated with the operation of the fuel feed circuit of an engine intended in particular for equipping a motor vehicle.

The plastic is a polymer plastic which is solid under the normal conditions of use of the article and which is sulphonatable, such as known in other respects. This plastic material can consist of one or a number of polymers. In general, use is made of one or a number of thermoplastic hydrocarbon polymers having a linear basic molecular structure in which the optional substituents are non-aromatic. These polymers can be homopolymers, copolymers or their mixtures. As examples of such polymers, it is possible to use, for example, polyolefins or vinyl chloride polymers. Good results have been obtained from a polyolefin, in particular from a polyethylene. Excellent results have been obtained from a high density polyethylene (HDPE).

One or a number of conventional additives, such as antioxidants, stabilizers, pigments or others, can obviously be added to the plastic, insofar as they do not affect the ability of the article to be sulphonated nor substantially its properties, especially mechanical properties, for the purpose of its subsequent use.

The targeted articles comprise at least one surface essentially composed of a plastic. They can be, in their entirety, essentially composed of a single plastic or comprise a surface essentially composed of a plastic and, moreover, one or a number of other plastics or one or a number of other materials. Thus, the article can comprise one or a number of other layers or one or a number of other parts made of one or a number of other materials. It is thus possible to use in particular according to the invention a multi-layer article in which only the surface layer to be treated is essentially composed of a plastic. In the case of a hollow body, the surface layer to be treated can be the internal or external layer. Preferably, the internal layer of the hollow body is treated. Excellent results have been obtained on articles in their entirety essentially composed of a single plastic.

The process according to the invention can comprise one or a number of sulphonation stages. Preferably, it comprises a single sulphonation stage.

The sulphonation stage is carried out in a conventional way and under conventional conditions for a person skilled in the art. The articles to be treated are brought into contact with sulphur trioxide, diluted in an inert compound, in the liquid or gaseous phase. A dry inert gas, such as for example nitrogen, carbon dioxide, sulphur dioxide or air, is preferably used. It is important to avoid the presence of water vapour which could lead, by reaction with sulphur trioxide, to the formation of droplets of sulphuric acid. In general, from 0.1 to 35% by volume of sulphur trioxide, preferably from 15 to 30%, is incorporated. The contact time is inversely proportional to the sulphur trioxide concentration. It can in general be from 0.1 to 20 minutes. The pressure and the temperature can be adapted, especially as a function of the other operating parameters. The reaction can, in particular, be carried out at ambient temperature and ambient pressure.

Often, after sulphonation, the article or the container in which it is contained is purged from residual sulphur trioxide, for example with an inert gas such as nitrogen. It is also possible to neutralize the residual sulphur trioxide by a very brief injection of ammonia, of the order of a few seconds, in particular lasting less than 10 seconds. In the latter case, it is then preferable to rinse, most often with water, the article or the part of the article which will then be subjected to the neutralization stage.

The process according to the invention can comprise one or a number of neutralization stages of all or part of the article. It preferably comprises a single neutralization stage of all or part of the article.

The neutralization stage is carried out by bringing at least a part of the article which has to be superficially treated into contact with at least one polyamine compound. Polyamine compound is understood to denote an aliphatic compound comprising at least two amine functional groups. A polyalkylenepolyamine is advantageously used as polyamine compound. Among the polyalkylenepolyamines, good results have been obtained in particular with triethylenetetramine (TETA). An alkylenepolyamine can also be advantageously used as polyamine compound. Among the alkylenepolyamines, good results have been obtained with ethylenediamine (EDA). A polyalkyleneimine is also advantageously used as polyamine compound. Among the polyalkyleneimines, use may be made of homo- or copolymers which are unsubstituted, branched or linear, or substituted on the amine functional groups by alkyl or acyl groups. The molecular weight of these polyalkyleneimines can vary from 300 to 1 000 000. Excellent results have been obtained with a polyethyleneimine.

It is possible to use one or a number of polyamine compounds. For example, it is possible to use a mixture of polyamine compounds, from one or a number of polyalkylenepolyamines, alkylenepolyamines and/or polyalkyleneimines. Such a mixture can especially make it possible to combine the advantages of the use of a number of polyalkyleneimines of substantially different molecular weights. Preferably, a polyalkyleneimine with a molecular weight greater than 500,000 is not used alone. Advantageously, a mixture of a number of polyethyleneimines is used.

During the neutralization stage, the polyamine compound is generally present in a proportion of at least 0.05% by volume. It is preferably present in a proportion of at least 0.1% by volume and more preferentially still in a proportion of at least 1% by volume. The polyamine compound can be used pure or diluted. Advantageously, it is used diluted, in particular without exceeding 20% by volume and more particularly still without exceeding 10% by volume.

The polyamine compound can especially be diluted in water. The article can be brought into contact with a neutralization solution in the liquid or gaseous form. In the case of a hollow body, It is simple to fill it with an aqueous neutralization solution in liquid form. This solution can in particular be used in the form of an atomized jet.

The contact time for the neutralization stage can easily be optimized by a person skilled in the art from a few development tests, in connection with the other operating parameters. In practice, a short duration is sufficient. Good results have been obtained without having to exceed 5 minutes. The said contact time is often at least 10 seconds and preferably at least 1 minute.

The neutralization can be carried out within a wide temperature range, for example from 0° to 100° C., in particular when the polyamine compound is diluted in water. Good results have been obtained at ambient temperature.

The pressure can also be adapted to the other operating parameters. Good results have been obtained at atmospheric pressure.

After neutralization, the article is, if necessary, rinsed and/or dried, in order to remove therefrom the residual reaction products and neutralization agents.

The process according to the invention makes possible the surface treatment of an article over a sufficient depth in order substantially to improve its impermeability. In practice, the treated depth is often of the order of 5 to 30 microns. Preferably, it is at least 10 microns.

The surface treatment process according to the invention can advantageously be combined with the prior working of the constituent material(s) of the article.

The invention consequently also relates to a process for the manufacture of an article comprising at least one surface essentially composed of a plastic, the said process comprising at least one working stage and one surface treatment as defined above.

Working stage is understood to denote any known technique which can be used for the conversion of one or a number of materials and which makes it possible to produce an article. In the case of the working of one or a number of plastics, mention may be made, as non-limiting examples of working stage, of injection, extrusion, extrusion blow-moulding or calendering. In the specific case of a hollow body made of one or a number of plastics, it is preferable to carry out an extrusion blow-moulding as the working stage.

It can prove to be advantageous for the working stage to be quickly, in particular immediately, followed by the surface treatment.

Alternatively, the surface treatment can be carried out on the plastic from which at least one surface of the article will essentially be composed, even before the working stage, in particular on the polymer powder which has not yet been treated with additive.

EXAMPLES

Examples 1R and 6R which follow are given by way of comparison.

Examples 2 to 5, 7 and 8 illustrate the invention in a non-limiting way.

The permeability is expressed therein in g.mm/m$^2$.d, i.e. in grams of fuel times millimeters of thickness of the article per square meter of surface area for exchange with the outside and per day. It is in fact logical to assess the permeability of an article proportionally to its thickness and inversely proportionally to the surface area for exchange with the outside which it possesses, rather than to refer to a permeability expressed solely in grams of fuel per day. In fact, such a measurement would not take into account the effect of scale well known to a person skilled in the art, for example in the case of a hollow body, between a bottle, with a reduced thickness and surface area, and a fuel tank, with a greater thickness and greater exchange surface area.

Functioning permeability is understood to denote this property when it has become stable as a function of time. The time period necessary to arrive there is obviously related especially to the characteristics specific to the article and cannot be defined absolutely. By way of order of magnitude, it can, in particular, be estimated that the permeability of a bottle is functioning after approximately 1 month whereas approximately 3 months are necessary to reach the same state in the case of a tank.

EXAMPLE 1R

A bottle made of high density polyethylene (HDPE), with an internal volume of 360 cm$^3$, a thickness of 2 mm and an internal surface area of 280 cm$^2$, was produced by extrusion blow moulding. The HDPE used was of Phillips type with a mean density of 0.946 g/m$^3$ and HLMI (High Load Melt Index measured according to the ASTM standard 1238-1987) of 5.4 to 6.8 g/10 min and containing 1 g/kg of IRGANOX® 1076 stabilizer.

The internal surface of this bottle was brought into contact by injection and maintained for 10 minutes at ambient temperature and at atmospheric pressure with a gas flow containing 15% by volume of sulphur trioxide diluted in nitrogen.

The bottle was then purged with nitrogen for 5 minutes at ambient temperature and at atmospheric pressure.

It was then filled at ambient temperature and at atmospheric pressure with 200 cm$^3$ of an aqueous solution containing 10% by volume of ammonia and then agitated for 5 minutes.

The bottle was finally emptied, rinsed with water and dried in an oven at 60° C. overnight.

Evaluation of the permeability of this bottle was carried out with a mixture containing 92.5% by volume of lead-free CEC RF 08-A-85 petrol with an octane number of 95, 5% by volume of methanol and 2.5% by volume of ethanol (mixture known in the United States under the name TF2= Test Fuel 2). The bottle was filled with 300 cm$^3$ of this mixture, stoppered, weighed and stored in a room at 40° C.

After 1 month, under functioning conditions, its permeability, measured by loss in weight according to ECE standard 34-1979 (Appendix 5), was 14.3 g.mm/m$^2$.d.

By way of comparison, the same untreated bottle lost, under functioning conditions, 71 g.mm/m$^2$.d.

EXAMPLE 2

A bottle identical to that according to Example 1R was treated in the same way, apart from the fact that the neutralization was carried out by filling the bottle with an aqueous solution containing 10% by volume of Lupasol® WF polyethyleneimine with a molecular weight equal to 20,000.

After 1 month, under functioning conditions, its permeability, measured by loss in weight according to ECE standard 34-1979 (Appendix 5), was 1.43 g.mm/m$^2$.d.

EXAMPLE 3

A bottle identical to that according to Example 1R was treated in the same way as according to this example, apart from the fact that the neutralization was carried out by filling the bottle with pure ethylenediamine (Merck Index, 10th edition, 3741).

After 1 month, under functioning conditions, its permeability, measured by loss in weight according to ECE standard 34-1979 (Appendix 5), was 2.85 g.mm/m$^2$.d.

EXAMPLE 4

A bottle identical to that according to Example 1R was treated in the same way as according to this example, apart from the fact that, for the neutralisation, the bottle was filled with an aqueous solution comprising 10% by volume of triethylenetetramine (Merck Index, 10th edition, 9483).

After 1 month, under functioning conditions, its permeability, measured by loss in weight according to ECE standard 34-1979 (Appendix 5), was 2.14 g.mm/m$^2$.d.

EXAMPLE 5

A bottle identical to that according to Example 1R was treated in the same way as according to this example, apart from the fact that, for the neutralization, the bottle was filled with an aqueous solution comprising 10% by volume of a mixture of equal parts by volume of LUPASOL® WF polyethyleneimine (PEI) and ethylenediamine (EDA).

After 1 month, under functioning conditions, its permeability, measured by loss in weight according to ECE standard 34-1979 (Appendix 5), was 1.43 g.mm/m$^2$.d.

EXAMPLE 6R

A fuel tank made of high density polyethylene (HDPE), with an internal volume of 60 liters, a mean thickness of 5 mm and an internal surface area of 15 m$^2$, was produced by extrusion blow moulding. The HDPE used had a mean density of 0.948 g/cm$^3$, an HLMI of 3.4 g/10 min and contained 0.2 g/kg of carbon black and 2 g/kg of IRGA-NOX® B 225 stabilizer.

The internal surface of this tank was brought into contact by injection and maintained for 2 minutes at 49° C. and at atmospheric pressure with a gas flow containing 15% by volume of sulphur trioxide diluted in nitrogen.

The tank was then purged with nitrogen for 2 minutes at ambient temperature and at atmospheric pressure.

It was then filled at ambient temperature and at atmospheric pressure with a mixture comprising 70% by volume of ammonia and 15% by volume of air dampened with 15% by volume of water in the form of fine atomized droplets for 100 seconds.

The tank was finally emptied, rinsed with water and dried in an oven at 60° C. overnight.

Evaluation of the permeability of the tank was carried out with a mixture containing 90% by volume of lead-free CEC RF 08-A-85 petrol, with an octane number of 95, and 10% by volume of ethanol (mixture known in the United States under TF1=Test Fuel 1). The tank was filled with 30 liters of this mixture, stoppered, weighed and stored in a room at 40° C.

After 3 months, under functioning conditions, its permeability, measured by loss in weight according to ECE standard 34-1979 (Appendix 5), was 10 g.mm/m$^2$.d.

The permeability of this tank was also evaluated according to the SHED measurement as described in "Measurement of fuel evaporative emission from gasoline powered passenger cars and light trucks, technical enclosure SAE J171, June 82". After 3 months, under functioning conditions, the permeability of the tank, measured according to this method, was 8.3 g.mm/m$^2$.d.

EXAMPLE 7

A fuel tank identical to that according to Example 6R was treated in the same way, apart from the fact that, for the neutralization, the tank was filled with 3 liters of an aqueous solution containing 5% by volume of LUPASOL® polyethyleneimine with a molecular weight of between 600,000 and 1,000,000 and then agitated for 3 minutes.

After 3 months, under functioning conditions, its permeability, measured by loss in weight according to ECE standard 34-1979 (Appendix 5), was 1 g.mm/m$^2$.d.

At the same time, the permeability of the tank, measured according to the abovementioned SHED method, was 0.83 g.m./m$^2$.d.

EXAMPLE 8

A fuel tank identical to that according to Example 6R was treated in the same way, apart from the fact that, for the neutralization, the tank was filled with 3 liters of an aqueous solution containing 5% by volume of a mixture containing equal parts of Lupasol® P polyethyleneimine with a molecular weight of between 600,000 and 1,000,000 and LUPASOL® G polyethyleneimine with a molecular weight of approximately 2,000 and then agitated for 3 minutes.

After 3 months, under functioning conditions, the permeability of the tank, measured according to the abovementioned SHED method, was 0.67 g.mm/m$^2$.d.

What is claimed is:

1. A process for the surface treatment of at least a part of an article comprising at least one surface essentially composed of a plastic, said process comprising contacting said at least one plastic surface in at least one sulphonation stage and in at least one neutralization stage, said neutralization stage carried out by contact with a mixture of polyamine compounds.

2. The process according to claim 1, in which the article is a hollow body.

3. The process according to claim 2, in which the hollow body is a fuel tank.

4. The process according to claim 1, in which the plastic is a high density polyethylene.

5. The process according to claim 1, in which the mixture includes a polyalkylenepolyamine.

6. The process according to claim 1, in which the mixture includes an alkylenepolyamine.

7. The process according to claim 1, in which the mixture includes a polyalkyleneimine.

8. The process according to claim 7, in which the polyalkyleneimine is a polyethyleneimine.

9. A process for the manufacture of said article comprising at least one surface essentially composed of said plastic, said process comprising at least one working stage and one surface treatment according to claim 1.

10. A process for surface treatment of at least a part of a hollow body comprising at least one surface essentially composed of high density polyethylene, said process comprising at least one sulphonation stage and at least one neutralization stage carried out by contact with a mixture of polyamine compounds including at least one compound selected from the group consisting of polyalkylene polyamine, alkylene polyamine, and polyalkyleneimine.

11. The process according to claim 10, wherein said mixture includes a polyalkylene polyamine.

12. The process according to claim 10, wherein said mixture includes an alkylene polyamine.

13. The process according to claim 10, wherein said mixture includes a polyalkyleneimine.

14. The process according to claim 13, in which the polyalkyleneimine is a polyethyleneimine.

15. A process for the manufacture of a hollow body comprising at least one surface essentially composed of high density polyethylene, said process comprising at least one working stage and one surface treatment according to claim 10.

* * * * *